(12) United States Patent
Ahn et al.

(10) Patent No.: US 10,817,069 B2
(45) Date of Patent: Oct. 27, 2020

(54) NAVIGATION GESTURE RECOGNITION SYSTEM AND GESTURE RECOGNITION METHOD THEREOF

(71) Applicant: Korea Electronics Technology Institute, Seongnam-si, Gyeonggi-do (KR)

(72) Inventors: Yang Keun Ahn, Seoul (KR); Young Choong Park, Goyang-si (KR)

(73) Assignee: KOREA ELECTRONICS TECHNOLOGY INSTITUTE, Seongnam-si, Gyeonggi-Do (KR)

( * ) Notice: Subject to any disclaimer, the term of this patent is extended or adjusted under 35 U.S.C. 154(b) by 40 days.

(21) Appl. No.: 15/983,713

(22) Filed: May 18, 2018

(65) Prior Publication Data

US 2019/0138104 A1 May 9, 2019

(30) Foreign Application Priority Data

Nov. 6, 2017 (KR) .................. 10-2017-0146536

(51) Int. Cl.
*G06F 3/01* (2006.01)
*G06F 3/042* (2006.01)

(52) U.S. Cl.
CPC ............ *G06F 3/017* (2013.01); *G06F 3/0425* (2013.01)

(58) Field of Classification Search
CPC ..................................................... G06F 3/017
See application file for complete search history.

(56) References Cited

U.S. PATENT DOCUMENTS

| 2012/0056989 A1* | 3/2012 | Izumi ................ G06F 3/0488 |
| | | 348/46 |
| 2014/0152549 A1 | 6/2014 | Kim | |
| 2015/0331492 A1* | 11/2015 | Woo ................ G06K 9/00355 |
| | | 345/156 |
| 2016/0357319 A1* | 12/2016 | Kim ..................... G06F 3/0416 |

FOREIGN PATENT DOCUMENTS

| KR | 1020140072734 A | 6/2014 |
| KR | 10-2015-0130808 A | 11/2015 |
| KR | 10-2015-0140097 A | 12/2015 |

OTHER PUBLICATIONS

Korean Office Action dated Apr. 18, 2019 for corresponding Korean Application No. 10-2017-0146536, citing the above references.

* cited by examiner

*Primary Examiner* — Hang Lin
(74) *Attorney, Agent, or Firm* — Hauptman Ham, LLP

(57) ABSTRACT

Provided are a navigation gesture recognition system and a gesture recognition method thereof. The navigation gesture recognition system includes a depth camera configured to capture a depth image, a memory configured to store a program for recognizing a navigation gesture of an object, and a processor configured to execute the program stored in the memory, wherein the processor executes the program to generate a virtual spatial touch screen from the depth image, detects a moving direction of a gesture of the object included in the depth image on the spatial touch screen, and generates a control command corresponding to the moving direction.

11 Claims, 8 Drawing Sheets

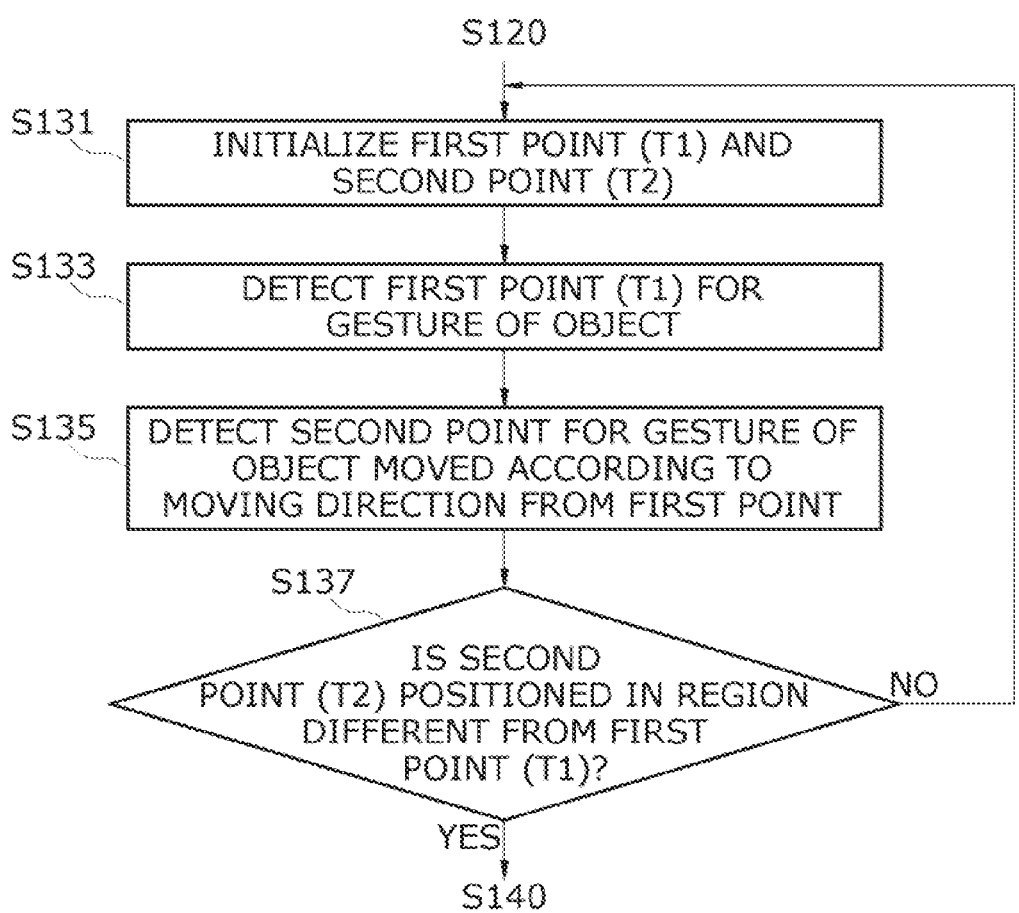

NAVIGATION GESTURE RECOGNITION SYSTEM AND GESTURE RECOGNITION METHOD THEREOF

CROSS-REFERENCE TO RELATED APPLICATION

This application claims priority to and the benefit of Korean Patent Application No. 2017-0146536, filed on Nov. 6, 2017, the disclosure of which is incorporated herein by reference in its entirety.

BACKGROUND

1. Field of the Invention

The present invention relates to a navigation gesture recognition system and a gesture recognition method thereof.

2. Discussion of Related Art

FIG. 1 is a view for describing an object recognition apparatus according to a conventional technique.

In the conventional technique, a method in which a user's hand is detected, a position of the detected hand is linearly traced, and traces P1 to P5 of the hand are analyzed to recognize the up, down, left, and right motions of the hand is used.

However, in the conventional technique, it is necessary to provide a method of stably detecting various types of hands under various environmental conditions. This method has a problem in that an algorithm thereof is complex and difficult to implement.

In this regard, in Korean Laid-open Patent Publication No. 10-2014-0072734 (Title: SYSTEM AND METHOD FOR PROVIDING A USER INTERFACE USING HAND SHAPE TRACE RECOGNITION IN A VEHICLE), a method in which a user interface is manipulated using hand shape trace recognition by receiving an image obtained by capturing a passenger, recognizing a hand shape trace of the passenger from the image obtained by capturing the passenger, and selecting manipulation of vehicle devices that correspond to the recognized hand shape trace is disclosed.

SUMMARY OF THE INVENTION

The present invention is directed to providing a navigation gesture recognition system capable of generating a virtual spatial touch screen in upper, lower, left, and right spaces using a three-dimensional depth camera and recognizing up, down, left, and right motions according to a sequence of touching the spatial touch screen, and a gesture recognition method thereof.

However, the scope of the present invention is not limited to the above-described object, and other unmentioned objects may exist.

According to an aspect of the present invention, there is provided a navigation gesture recognition system including a depth camera configured to capture a depth image, a memory configured to store a program for recognizing a navigation gesture of an object, and a processor configured to execute the program stored in the memory, wherein the processor executes the program to generate a virtual spatial touch screen from the depth image, detects a moving direction of a gesture of the object included in the depth image on the spatial touch screen, and generates a control command corresponding to the moving direction.

The processor may divide a physical surface of the object from the depth image into a plurality of three-dimensional points, and detect the moving direction of the gesture on the basis of whether the plurality of three-dimensional points are positioned on the spatial touch screen.

The processor may detect a first point for the gesture of the object included in the depth image and a second point for the gesture of the object moved according to the moving direction from the first point, and detect the moving direction of the gesture on the basis of location information of the detected first point and second point on the spatial touch screen.

The spatial touch screen may be divided into a first group region and a second group region formed in a direction perpendicularly crossing the first group region, and a plurality of regions included in each of the first group region and the second group region may be generated parallel to each other.

The processor may detect a first point for the gesture of the object included in the depth image and a second point for the gesture of the object moved according to the moving direction from the first point, and detect the moving direction of the gesture on the basis of whether the detected first point and second point are positioned in a plurality of regions included in any one group region among the first group region and the second group region.

When the second point is detected as being positioned in the same region as the first point among the plurality of regions included in any one group region or when the second point is not detected as being positioned in a region different from the first point, the processor may initialize the detected first and second points.

At least one of the first group region and the second group region may include three or more regions. In this case, the processor may detect moving directions and moving distances for three or more regions parallel to each other and generate control commands corresponding to the moving directions and the moving distances.

The processor may detect a starting point of a motion of the object included in the depth image on the spatial touch screen, generate the starting point of the motion as any one region included in the first group region, and generate regions which are parallel to each other or perpendicularly cross each other on the basis of the generated one region.

According to another aspect of the present invention, there is provided a gesture recognition method in a navigation gesture recognition system including receiving a depth image from a depth camera, generating a virtual spatial touch screen from the depth image, detecting a moving direction of a gesture of an object included in the depth image on the spatial touch screen, and generating a control command corresponding to the moving direction.

The generating of the virtual spatial touch screen from the depth image may include generating a first group region including a plurality of regions arranged in parallel, and generating a second group region which is formed in a direction perpendicularly crossing the first group region and includes a plurality of regions arranged in parallel.

The detecting of the moving direction on the spatial touch screen may include detecting a first point for the gesture of the object included in the depth image, detecting a second point for the gesture of the object moved according to the moving direction from the first point, and detecting the moving direction of the gesture on the basis of whether the detected first point and second point are positioned in the plurality of regions included in any one group region among the first group region and the second group region.

When the second point is detected as being positioned in the same region as the first point among the plurality of regions included in any one group region or when the second point is detected as being positioned in a region different from the first point, the present invention may further include initializing the detected first and second points.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 7 is a flowchart of operations for detecting a moving direction on a spatial touch screen.

DETAILED DESCRIPTION OF EXEMPLARY EMBODIMENTS

Figure 1:
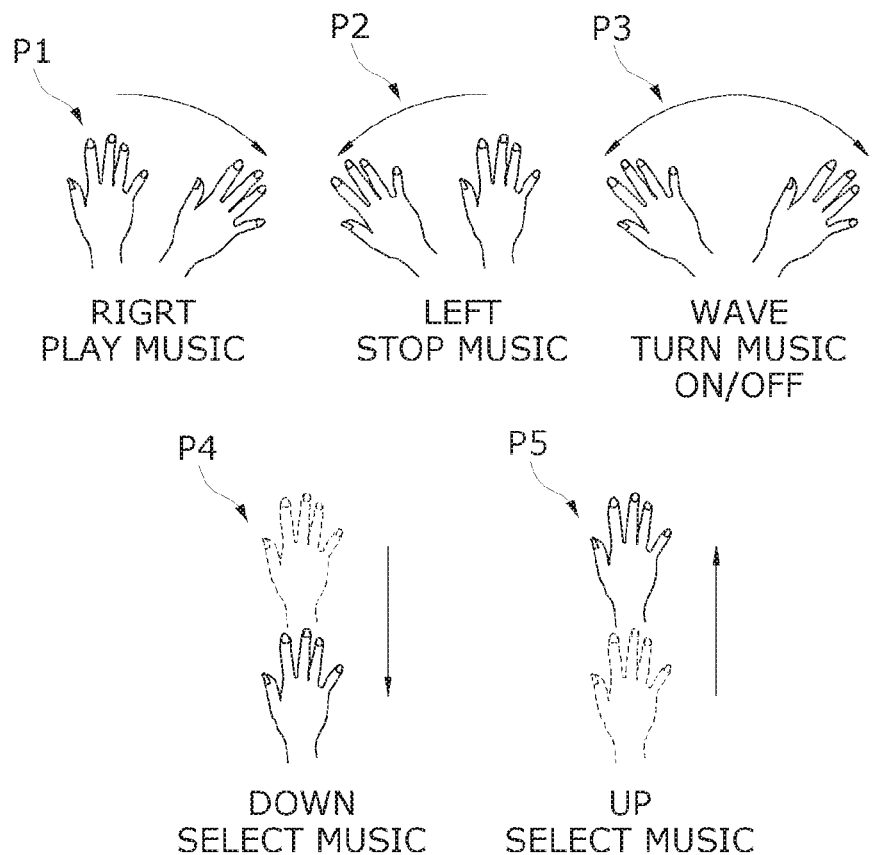
FIG. 1 is a view for describing an object recognition apparatus according to a conventional technique.

Hereinafter, embodiments of the present invention that are easily performed by those skilled in the art will be described in detail with reference to the accompanying drawings. However, the embodiments of the present invention may be implemented in several different forms, and are not limited to the embodiments described herein. In addition, parts irrelevant to description are omitted in the drawings in order to clearly explain the embodiments of the present invention. Throughout this specification, when a certain part "includes" a certain component, it means that another component may be further included not excluding another component unless otherwise defined.

Figure 2:
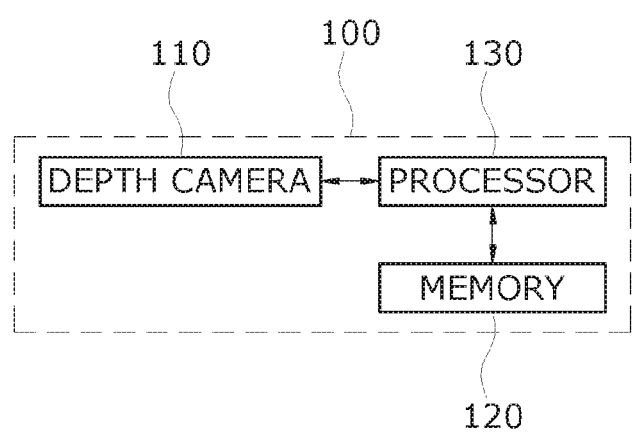
FIG. 2 is a block diagram of a navigation gesture recognition system according to an embodiment of the present invention.
Figure 3A:
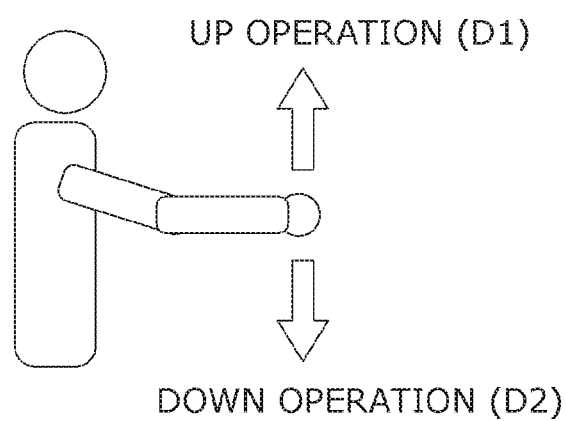
FIG. 3A and FIG. 3B are views for describing navigation gestures.
Figure 3B:
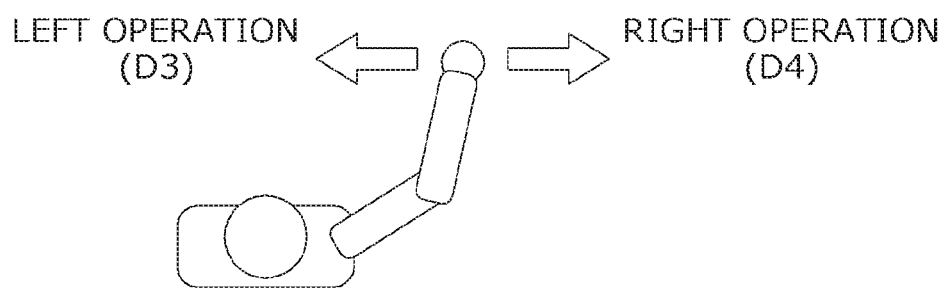

FIG. 2 is a block diagram of a navigation gesture recognition system 100 according to an embodiment of the present invention. FIG. 3A and FIG. 3B are views for describing navigation gestures.

The navigation gesture recognition system 100 according to the embodiment of the present invention includes a depth camera 110, a memory 120, and a processor 130.

The depth camera 110 is a component configured to capture a depth image, and a virtual spatial touch screen is generated and included in the depth image and an object is also included therein. In this case, the object may be a body part, such as a user's hand, or another object, but the present invention is not limited to any particular one. Meanwhile, it should be understood that the depth image may be captured and generated by various methods, such as a method using the depth camera 110, a method using stereo matching of reference images captured at multiple points of sight, and the like.

A program for recognizing a navigation gesture of an object is stored in the memory 120. In this case, the memory 120 is collectively referred to as a non-volatile storage which maintains stored information even when power is not supplied, and a volatile storage.

For example, the memory 120 may include an NAND flash memory, such as a compact flash (CF) card, a secure digital (SD) card, a memory stick, a solid-state drive (SSD), a micro SD card, or the like, a magnetic computer memory, such as a hard disk drive (HDD) or the like, or an optical disc drive such as a compact disc read only memory (CD-ROM), a digital video disc ROM (DVD-ROM), or the like.

Meanwhile, the navigation gesture (hereinafter, referred to as a gesture) refers to an operation for controlling up, down, left, and right motions of a current menu in a menu structure in which a menu may be moved by commands such as up, down, left, and right as shown in FIG. 3A and FIG. 3B.

Referring again to FIG. 2, as the processor 130 executes the program stored in the memory 120, when the processor 130 receives the depth image captured by the depth camera 110, the processor 130 generates a virtual spatial touch screen from the depth image.

In addition, a moving direction of the gesture of the object included in the depth image on the spatial touch screen is detected, and a control command corresponding to the moving direction is generated. In this case, the control command may be stored in the memory 120 to match a specific function of a device to be controlled, such as volume up, volume down, channel switch, or the like.

Hereinafter, the virtual spatial touch screen generated by the processor 130 and a method of detecting the moving direction of the gesture of the object on the spatial touch screen will be described in detail.

Figure 4A:
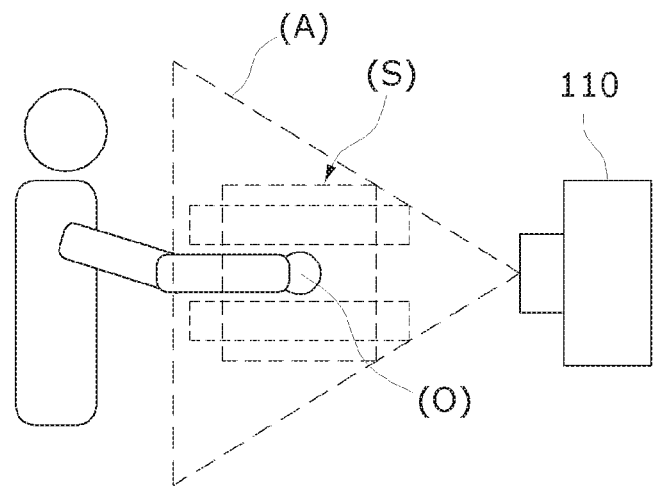
FIG. 4A and FIG. 4B are views for describing a method of detecting a moving direction of a gesture of an object.
Figure 4B:
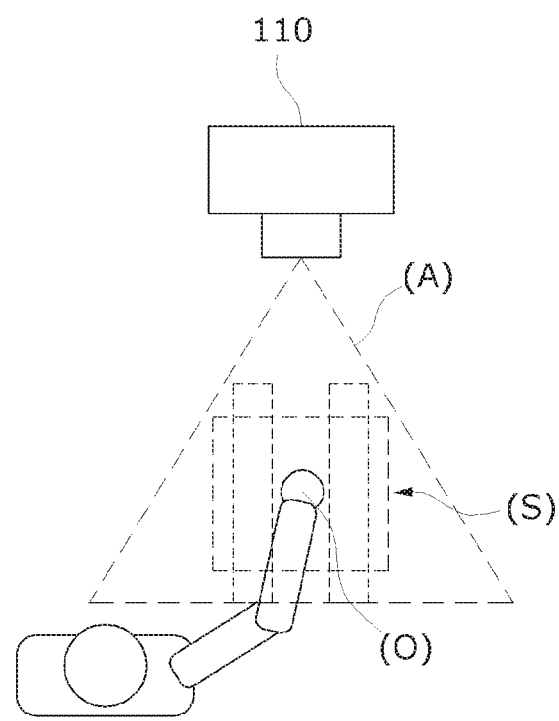

FIG. 4A and FIG. 4B are views for describing the method of detecting the moving direction of the gesture of the object. FIG. 5A, FIG. 5B, FIG. 5C and FIG. 5D are views for describing the spatial touch screens.

The processor 130 may divide a physical surface of the object from the depth image into a plurality of three-dimensional points, and detect the moving direction of the gesture on the basis of whether the plurality of three-dimensional points are positioned on the spatial touch screen.

That is, the processor 130 detects a first point for the gesture of the object included in the depth image, and detects a second point for the gesture of the object moved according to the moving direction from the first point. In this case, the first point and the second point may include one or more three-dimensional points. In addition, the processor 130 may detect the moving direction of the gesture on the basis of location information of the detected first point and second point on the spatial touch screen.

Meanwhile, in the embodiment of the present invention, a range A in which the spatial touch screen is generated may be designated as shown in FIG. 4A and FIG. 4B.

The spatial touch screen should be generated at an appropriate position in relation to the depth camera 110 and the object. To this end, in the embodiment of the present invention, the range A in which the spatial touch screen is generated may be designated by the user, or may be designated on the basis of a capturing range of the depth camera 110.

Alternatively, the range A in which the spatial touch screen is generated may be designated on the basis of at least one of a maximum moving distance and an average moving distance of the object.

Here, the maximum moving distance of the object refers to a maximum distance of the object that may move up and down or left and right.

In addition, the average moving distance of the object refers to a value obtained by averaging moving distances of the object that moves up and down or left and right plural times. When the range A in which the spatial touch screen is generated is designated using the average moving distance, it is possible to generate the spatial touch screen in a range optimized for a user's body condition, and thus a more accurate recognition rate may be provided.

Figure 5A:
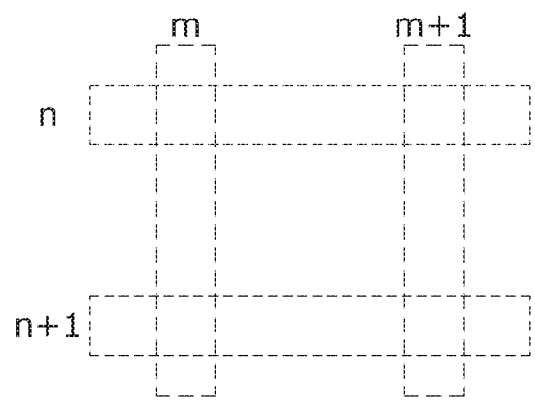
FIG. 5A.
Figure 5B:
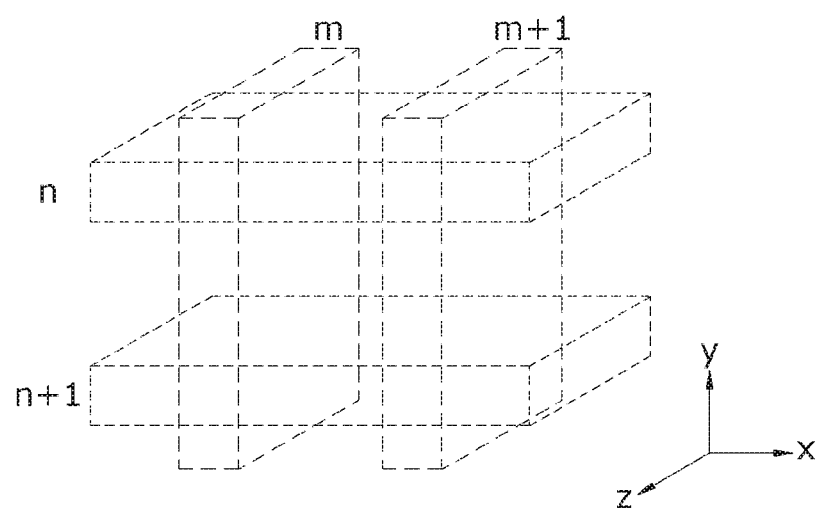
FIG. 5B, FIG. 5C and FIG. 5D are views for describing spatial touch screens.

Meanwhile, the spatial touch screen according to the embodiment of the present invention may be generated to be divided into a first group region (n and (n+1)) and a second group region (m and (m+1)) as shown in FIG. 5A and FIG. 5B.

In this case, a plurality of regions included in each of the first group region and the second group region may be generated parallel to each other, and the second group region may be generated in a direction perpendicularly crossing the first group region.

Specifically, the first group region and the second group region may be generated as follows.

First, when the processor 130 detects a starting point of a motion of the object included in the depth image on the spatial touch screen, the processor 130 may generate the detected starting point of the motion as any one region included in the first group region. Next, the processor 130 may generate regions which are parallel to each other or perpendicularly cross each other with respect to the generated one region.

For example, as shown in FIG. 5A, a point at which the starting point of the motion of the gesture of the object is detected may be generated as a first region n of the first group region (n and (n+1)). Next, the processor 130 may generate a second region n+1, which is parallel to the first region n of the first group region (n and (n+1)), within the range A in which the spatial touch screen is generated, according to a preset interval, and may simultaneously or sequentially generate a first region m and a second region (m+1) of the second group region (m and (m+1)).

Accordingly, according to the embodiment of the present invention, the regions constituting the spatial touch screen corresponding to the moving direction of the gesture of the object may be generated within the range A in which the spatial touch screen is generated, and thus it is expected that a gesture recognition rate may be further increased.

Meanwhile, the first group region and the second group region may be configured as only two-dimensional regions including an x-axis and a y-axis as shown in FIG. 5A, or may be configured as three-dimensional regions to which a z-axis is added as shown in FIG. 5B. In this case, the range of the x, y, and z axes may be set according to the condition of the range A in which the spatial touch screen is generated.

Figure 5C:
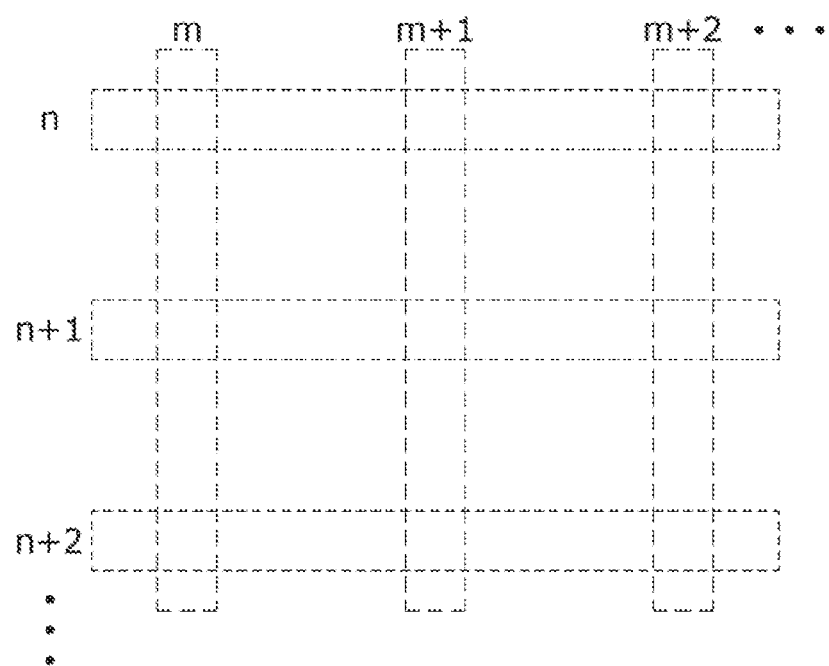
Figure 5D:
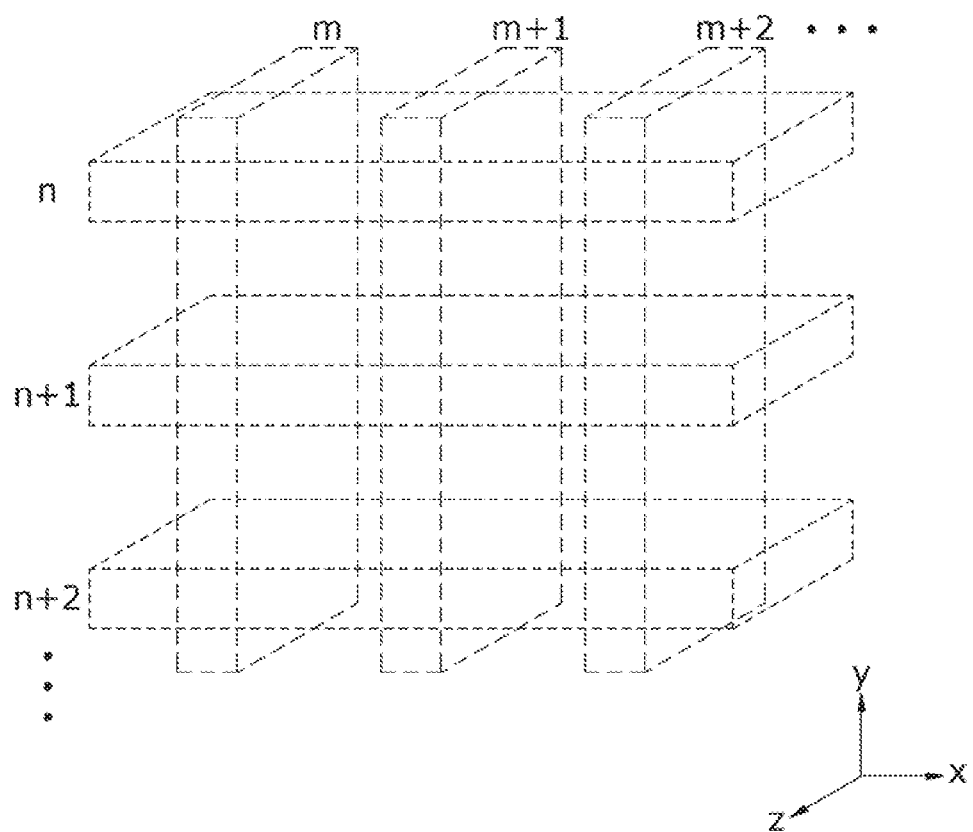

Further, in the spatial touch screen according to the embodiment of the present invention, each of a first group region (n, (n+1), (n+2), . . . ) and a second group region (m, (m+1), (m+2), . . . ) may include three or more regions as shown in FIG. 5C and FIG. 5D.

Accordingly, the processor 130 may detect not only moving directions but also moving distances for three or more regions parallel to each other, and generate a control command corresponding to the moving directions and moving distances.

For example, when an object touches a second region (n+1) after touching a first region (n) of the first group region, a moving direction is a downward direction and two regions are touched, and thus the processor 130 may generate a control command that causes a volume of a device to be reduced by one level.

On the other hand, when the object touches the second region (n+1) and a third region (n+2) within a preset time after touching the first region (n), three regions are touched even in the same moving direction as the above case, and thus the processor 130 may generate a control command that causes the volume of the device to be reduced by two or more levels.

As described above, in the embodiment of the present invention, the control command may be generated by reflecting the moving distance as well as the moving direction on the virtual spatial touch screen, and thus the device may be controlled in a simple and more diverse way.

Once the virtual spatial touch screen as described above is generated, the processor 130 detects a first point for the gesture of the object included in the depth image, and detects a second point for the gesture of the object moved according to the moving direction from the first point. In addition, the processor 130 may detect the moving direction of the gesture on the basis of whether the detected first point and second point are positioned in a plurality of regions included in any one group region among the first group region and the second group region.

For example, referring to FIG. 5A and FIG. 5B, in a state in which the first and second points are detected from the depth image, when the processor 130 detects that the first point is positioned in the first region n of the first group region (n and (n+1)) and the second point is positioned in the second region (n+1) of the first group region (n and (n+1)), the processor 130 may determine that the moving direction of the object is a downward direction.

Similarly, when the first point is detected as being positioned in the second region (n+1) of the first group region (n and (n+1)) and the second point is detected as being positioned in the first region n of the first group region (n and (n+1)), the processor 130 may determine that the moving direction of the object is an upward direction.

Further, the processor 130 may determine that the object moves in a lateral direction by the detected positions of the first and second points with respect to the second group region (m and (m+1)).

In this case, when the second point is detected as being positioned in the same region as the first point among the plurality of regions included in the first group region or the second group region, the processor 130 may initialize the detected first and second points.

Further, even when the second point is detected as not being positioned in the same region as the first point and as being positioned in another region, the processor 130 may initialize the detected first and second points. For example, the above case is a case in which the second point is detected between the first region and the second region of the first group region or is detected outside the range A in which the spatial touch screen is generated because the user's gesture is too small, and may be a case in which no region is included in the moving direction of the gesture.

Further, even when the user's gesture moves in a diagonal direction and the second point is detected in the second group region which does not overlap the first group region after the first point is detected in the first group region or vice versa, the processor 130 may initialize the first and second points.

That is, even when the user's gesture moves in the diagonal direction, in the case in which the second point is detected in the first group region via the second group region after the first point is detected in the first group region, the processor 130 treats the user's gesture as a gesture in any one of up, down, left, and right directions. However, in the case in which the second point is not detected in the first group region, the processor 130 may initialize the first and second points without recognizing the user's gesture in the diagonal direction.

As described above, in the embodiment of the present invention, it is possible not only to simply detect the moving direction but also to distinguish an erroneous gesture operation, thereby allowing the user to induce a correct gesture operation.

Further, function control is possible only with the simplest operation of the gesture. Particularly, when the user takes a gesture, for example, moving from left to right, not all users may make a gesture horizontally, but some may make a gesture with a certain angle up and down. In this case, in the conventional technique, there is a problem in that confusion exists between the diagonal direction and the left and right direction, but the present invention has an advantage in that a higher recognition rate may be provided by eliminating such errors.

For reference, the components shown in FIG. 2 according to the embodiment of the present invention may be implemented in software or hardware such as a field programmable gate array (FPGA) or an application specific integrated circuit (ASIC), and may perform predetermined roles.

However, the components are not limited to software or hardware, and each component may be configured to be in an addressable storage medium and configured to play back one or more processors.

Therefore, for example, the components include components, such as software components, object-oriented software components, class components, and task components, and include processes, functions, attributes, procedures, subroutines, segments of program code, drivers, firmware, microcode, circuitry, data, databases, data structures, tables, arrays, and parameters.

The components and functions provided within the corresponding components may be combined into a smaller number of components or may be further separated into additional components.

Hereinafter, a method of recognizing a gesture in the navigation gesture recognition system 100 according to the embodiment of the present invention will be described with reference to FIG. 6 and FIG. 7.

Figure 6:
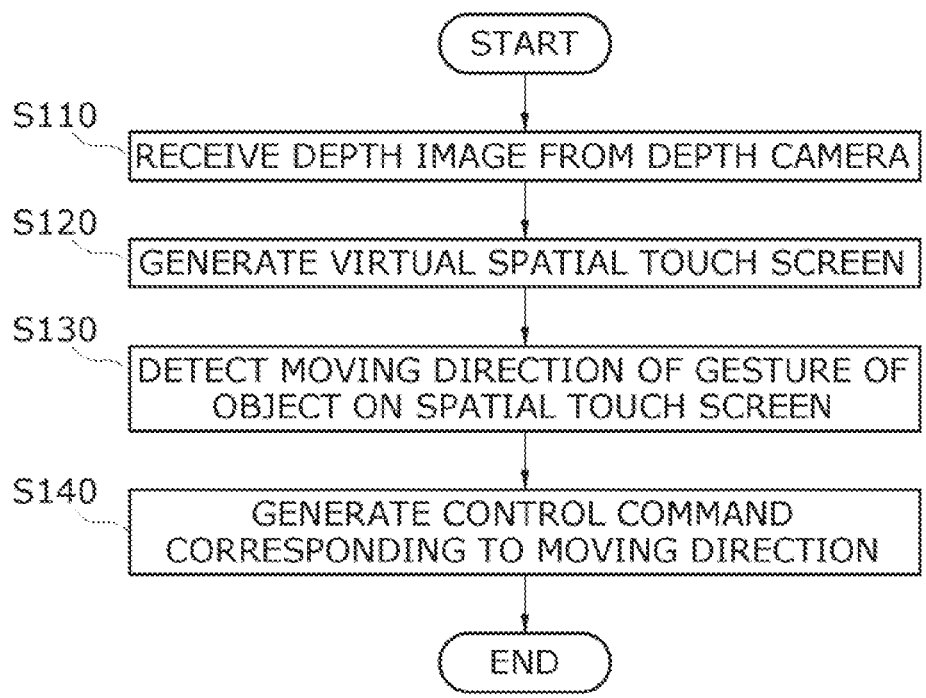
FIG. 6 is a flowchart of a method of recognizing a gesture according to an embodiment of the present invention.

FIG. 6 is a flowchart of a method of recognizing a gesture according to an embodiment of the present invention. FIG. 7 is a flowchart of operations for detecting a moving direction on a spatial touch screen.

In the method of recognizing the gesture according to the embodiment of the present invention, first, when a depth image is received from the depth camera 110 (S110), a virtual spatial touch screen is generated from the depth image (S120).

In this case, the generation of the virtual spatial touch screen may include generating a first group region including a plurality of regions arranged in parallel, and then generating a second group region which is formed in a direction perpendicularly crossing the first group region and includes a plurality of regions.

Next, a moving direction of a gesture of an object included in the depth image on the spatial touch screen is detected (S130), and a control command corresponding to the detected moving direction is generated (S140).

In this case, the detection of the moving direction (S130) may include initializing a first point and a second point first (S131), detecting the first point for the gesture of the object included in the depth image (S133), and detecting the second point for the gesture of the object moved according to the moving direction from the first point (S135).

Next, the moving direction of the gesture is detected on the basis of whether the detected first point and second point are positioned in a plurality of regions included in any one group region among the first group region and the second group region.

Particularly, when the second point is detected as being positioned in the same region as the first point among a plurality of regions included in any one group region or when the second point is not detected as being positioned in a region different from the first point (S137), the detected first and second points are initialized.

On the other hand, when the second point is detected as being positioned in the region different from the first point (S137), a control command corresponding to the detected moving direction is generated (S140).

Meanwhile, operations S110 to S140 in the above description may be further divided into additional operations or combined in fewer operations in some embodiments of the present invention. Further, some of the operations may be omitted as necessary, and the order between the operations may be changed. In addition, the contents already described with respect to the navigation gesture recognition system 100 in FIG. 2 to FIG. 5D are applied to the method of recognizing the gesture described in FIG. 6 and FIG. 7, even when the contents are omitted.

As described above, according to the embodiment of the present invention, unlike the conventional technique in which a position of an object is recognized and a trace of the object is traced using a complex algorithm, it is expected that object recognition and tracking may be performed stably without complexity using a virtual spatial touch screen, and that a recognition rate may be increased and a misrecognition rate may be lowered.

Further, the present invention does not depend on the shape and color of the object, and thus it is possible to recognize the navigation gesture using an object having various shapes and colors combined.

Meanwhile, the embodiment of the present invention may also be realized in the form of a computer program stored in a medium executed by a computer or a recording medium including instructions executable by the computer. Computer readable media may be any available media which may be accessed by the computer and may include all of volatile and non-volatile media and separable and non-separable media. The computer readable media may also include both computer storage media and communication media. The computer storage media may include any of volatile and non-volatile media and separable and non-separable media, which are implemented using any method or technology for the storage of information such as computer readable instructions, data structures, program modules, or other data. The communication media typically include computer readable instructions, data structures, program modules, other data in a modulated data signal such as a carrier wave, or other transport mechanisms, and include arbitrary information delivery media.

While the method and system of the present invention have been described in connection with the specific embodiments, some or all of those components or operations thereof may be implemented using a computer system having a general purpose hardware architecture.

According to any one of the embodiments of the present invention, unlike a conventional technique in which a position of an object is recognized and a trace of the object is traced using a complex algorithm, it is expected that object recognition and tracing can be performed stably without complexity using a virtual spatial touch screen, and that a recognition rate can be increased and a misrecognition rate can be lowered.

The above description is only exemplary, and it will be understood by those skilled in the art that the present invention may be performed in other concrete forms without changing the technological scope and essential features. Therefore, the above-described embodiments should be considered as only examples in all aspects and not for purposes of limitation. For example, each component described as a single type may be realized in a distributed manner, and similarly, components that are described as being distributed may be realized in a coupled manner.

The scope of the present invention is defined not by the detailed description but by the appended claims, and encompasses all modifications and alterations derived from meanings, the scope and equivalents of the appended claims.

What is claimed is:

1. A navigation gesture recognition system comprising:
a depth camera configured to capture a depth image;
a memory configured to store a program for recognizing a navigation gesture of an object; and
a processor configured to execute the program stored in the memory,
wherein the processor executes the program to generate a virtual spatial touch screen from the depth image, detects a moving direction of a gesture of the object included in the depth image on the spatial touch screen, and generates a control command corresponding to the moving direction,
wherein the processor executes the program to generate the virtual spatial touch screen on a basis of a maximum distance of the object and an average moving distance of the object, and the average moving distance is a value obtained by averaging moving distances of the object multiple times, and
wherein the spatial touch screen is divided into a first group region and a second group region formed in a direction perpendicularly crossing the first group region, and a plurality of regions included in each of the first group region and the second group region are generated parallel to each other.

2. The navigation gesture recognition system of claim 1, wherein the processor divides a physical surface of the object from the depth image into a plurality of three-dimensional points, and detects the moving direction of the gesture on the basis of whether the plurality of three-dimensional points are positioned on the spatial touch screen.

3. The navigation gesture recognition system of claim 1, wherein the processor detects a first point for the gesture of the object included in the depth image and a second point for the gesture of the object moved according to a moving direction from the first point, and detects a moving direction of the gesture on the basis of location information of the detected first point and second point on the spatial touch screen.

4. The navigation gesture recognition system of claim 1, wherein the processor detects a first point for the gesture of the object included in the depth image and a second point for the gesture of the object moved according to a moving direction from the first point, and detects a moving direction of the gesture on the basis of whether the detected first point and second point are positioned in a plurality of regions included in any one group region among the first group region and the second group region.

5. The navigation gesture recognition system of claim 4, wherein, when the second point is detected as being positioned in the same region as the first point among the plurality of regions included in any one group region or when the second point is not detected as being positioned in a region different from the first point, the processor initializes the detected first and second points.

6. The navigation gesture recognition system of claim 1, wherein:
at least one of the first group region and the second group region includes three or more regions; and
the processor detects moving directions and moving distances for three or more regions parallel to each other and generates control commands corresponding to the moving directions and the moving distances.

7. The navigation gesture recognition system of claim 1, wherein the processor detects a starting point of a motion of the object included in the depth image on the spatial touch screen, generates the starting point of the motion as any one region included in the first group region, and generates regions which are parallel to each other or perpendicularly cross each other on the basis of the generated one region.

8. A gesture recognition method in a navigation gesture recognition system, the gesture recognition method comprising:
receiving a depth image from a depth camera;
generating a virtual spatial touch screen from the depth image, comprising generating the virtual spatial touch screen on a basis of a maximum distance of the object and an average moving distance of the object, and the average moving distance is a value obtained by averaging moving distances of the object multiple times;
dividing the spatial touch screen into a first group region and a second group region, wherein the first group region and the second group region perpendicularly crossing each other, and a plurality of regions included in each of the first group region and the second group region are parallel to each other;
detecting a moving direction of a gesture of an object included in the depth image on the spatial touch screen; and
generating a control command corresponding to the moving direction.

9. The gesture recognition method of claim 8, wherein the detecting of the moving direction on the spatial touch screen includes:
detecting a first point for the gesture of the object included in the depth image;
detecting a second point for the gesture of the object moved according to the moving direction from the first point; and
detecting the moving direction of the gesture on the basis of whether the detected first point and second point are positioned in the plurality of regions included in any one group region among the first group region and the second group region.

10. The gesture recognition method of claim 9, further comprising, when the second point is detected as being positioned in the same region as the first point among the plurality of regions included in any one group region or when the second point is detected as being positioned in a region different from the first point, initializing the detected first and second points.

11. A navigation gesture recognition system comprising:
a depth camera configured to capture a depth image;

a memory configured to store a program for recognizing a navigation gesture of an object; and a processor configured to execute the program stored in the memory, wherein the processor executes the program to generate a virtual spatial touch screen from the depth image, detects a moving direction of a gesture of the object included in the depth image on the spatial touch screen, and generates a control command corresponding to the moving direction, wherein the processor executes the program to generate the virtual spatial touch screen on a basis of a maximum distance of the object and an average moving distance of the object, and the average moving distance is a value obtained by averaging moving distances of the object multiple times, and the virtual spatial touch screen occupies a space corresponding to a capturing range of the depth camera, and wherein the spatial touch screen is divided into a first group region and a second group region formed in a direction perpendicularly crossing the first group region, and a plurality of regions included in each of the first group region and the second group region are generated parallel to each other.

* * * * *